United States Patent
Bokamper

(10) Patent No.: US 6,954,049 B2
(45) Date of Patent: Oct. 11, 2005

(54) ELECTRIC MOTOR DRIVE FOR A PIECE OF FURNITURE

(75) Inventor: Ralf Bokamper, Lubbecke (DE)

(73) Assignee: Dewert Anttruebs-und Systemtechnik GmbH & Co. KG (DE)

( * ) Notice: Subject to any disclaimer, the term of this patent is extended or adjusted under 35 U.S.C. 154(b) by 0 days.

(21) Appl. No.: 10/496,278

(22) PCT Filed: Nov. 29, 2002

(86) PCT No.: PCT/EP02/13467

§ 371 (c)(1), (2), (4) Date: Sep. 15, 2004

(87) PCT Pub. No.: WO03/048877

PCT Pub. Date: Jun. 12, 2003

(65) Prior Publication Data

US 2005/0029980 A1 Feb. 10, 2005

(30) Foreign Application Priority Data

Dec. 7, 2001 (DE) .................. 201 19 899 U

(51) Int. Cl.⁷ ............... G05B 19/042; G05B 19/048
(52) U.S. Cl. ............... 318/565; 318/558; 318/560
(58) Field of Search ............... 318/558, 560, 318/565, 625, 671, 679

(56) References Cited

U.S. PATENT DOCUMENTS

| | | | | |
|---|---|---|---|---|
| 3,697,846 A | * | 10/1972 | Mueller | 318/544 |
| 3,711,664 A | * | 1/1973 | Benoit et al. | 200/5 R |
| 3,972,081 A | * | 8/1976 | Stern et al. | 5/618 |
| 6,259,355 B1 | * | 7/2001 | Chaco et al. | 340/286.07 |

FOREIGN PATENT DOCUMENTS

| | | | |
|---|---|---|---|
| DE | 26 22 624 | 11/1977 | |
| DE | 44 39 157 | 5/1996 | |
| DE | 44 46 710 | 6/1996 | |
| EP | 0 373 912 | 6/1990 | |
| EP | 0 581 474 | 2/1994 | |
| EP | 0581474 A1 * | 2/1994 | .......... A61G/7/018 |
| EP | 0 787 475 | 8/1997 | |

* cited by examiner

Primary Examiner—Bentsu Ro
(74) Attorney, Agent, or Firm—Fulbright & Jaworski LLP

(57) ABSTRACT

Electromotive furniture drive unit with one or more servomotors and having a manual control unit (1) equipped with switching elements (2, 3) and a signal processing device (14) for triggering functions, release elements (6, 7, 8, 9) being assigned to different hierarchical levels.

23 Claims, 2 Drawing Sheets

ELECTRIC MOTOR DRIVE FOR A PIECE OF FURNITURE

CROSS-REFERENCE TO RELATED APPLICATIONS

This Application is a National Stage of application PCT/EP02/13467 filed on Nov. 29, 2002, claiming priority to DE 20119899.1 filed Dec. 7, 2001.

TECHNICAL FIELD

The present invention relates to an electromotive furniture drive unit with one or more servomotors and having a manual control unit equipped with switching elements and a signal processing device for triggering functions.

BACKGROUND OF THE INVENTION

Furniture drive units of this kind are known in many versions for adjusting different pieces of furniture. The drive units move parts of the furniture, such as backs, seats, mattress angles and the like. Their adjustment functions are triggered by operating switching elements on a manual control unit. When the switching element concerned is released, the adjustment function is interrupted again.

Especially in the case of furniture in the nursing and hospital sectors, it is of great importance that adjustment functions may only be triggered by authorised persons, e.g. the nursing staff. In many cases, a person lying in a bed, for example, is not supposed to perform any adjustment at all. For this purpose, various blocking systems are known, such as key switches and, for instance, rotary switches in separate lock or supervisor boxes, which are located out of the reach of a patient.

From DE 94 04 382 it is known to use magnetic key and/or touch codes, chip cards and the like, together with an additional switching means which needs to accompany it.

One disadvantage that has become apparent here is that these are only single-stage blocking devices. Since, in the course of the further development of the products, the range of their functions has also expanded considerably, it is necessary to subdivide the functions into a number of hierarchies, for which the limited functionality of the known blocking devices is disadvantageous.

A further disadvantage consists in the fact that the visual display elements are not assigned to the release elements, but only to the outputs of the control logic. Any defect in a release element is not signalled to the operator.

The invention is therefore based on the problem of developing a blocking device for manual control units for electromotive furniture drive units which breaks down the available functions into hierarchical levels that can be selected individually. In the process, the visual display should be provided with circuitry such that any defect in a release element is immediately displayed to the operator. As an additional safety means, it should also be ensured that certain functions are deactivated once a predetermined time has passed.

BRIEF SUMMARY OF THE INVENTION

The solution to the problem consists in the fact that release elements are assigned to different hierarchical levels.

The dependent claims contain design features which constitute advantageous and beneficial further developments of the invention.

The electromotive furniture drive unit of the invention has a manual control unit whose switching elements, which may only be operated by authorised persons, each have a release element downstream. The release elements can be released individually and/or in groups. This subdivision into hierarchical levels can be either freely selectable or hard-wired, depending on the application. Free selectability can advantageously be achieved by connecting the respective release lines to the hierarchical levels, via switches for example. The switches can be wire links, preferably small DIP switches.

The hierarchical levels are formed by means of output signals from a signal processing device, the outputs of which are activated successively via a switching means. For this purpose, it is preferable to use a magnetic key which switches a component that is sensitive to a magnetic field, e.g. a Hall effect sensor, and which is located in the manual control unit. This takes place contact-free, which is particularly advantageous in a water-tight manual control unit of the kind used for the nursing and hospital fields.

In a further embodiment it is also proposed to use an infrared or radio link for this wireless signal path.

The signalling means is preferably designed as a shift register. The output signal line for the last hierarchical level is fed directly back into the signal processing device via a timing circuit as a reset signal, whereupon the latter switches back into the default state. In the default state, no output signal line is activated, i.e. all the release elements and their associated functions are blocked. Of these, the functions which a patient may always use can be excluded, because they do not contain any release element.

In a further embodiment, it is provided that the outputs of the release elements are provided with a display. It is preferable to use a multi-coloured LED for this purpose.

Since the display appears as a function of the outputs from the release elements, any defective release element is immediately recognised when the associated display fails to light up. In a further embodiment, the display elements are controlled by a display module which performs a comparison between the output signal of the signal processing device, i.e. a release signal, and the output signal of a release element. If a release signal does not result in an output signal from a release element, this error is signalled visually and/or acoustically by an error display.

In addition, it is provided that the output signals are applied to the timing circuit in a freely selectable way. This is particularly advantageous if certain functions need to be aborted automatically after a certain time, and if it is necessary to switch to a different hierarchical level or into the default state of complete blocking. This forms a particularly advantageous safety device.

Free selectability can likewise be achieved by means of wire links or switches, as described above.

It is advantageous to design the circuitry, especially for large series, in such a way that the hierarchical levels and release elements can be selected and implemented easily during assembly.

It is particularly economical to use wire links that can be unplugged and which, depending on the application, bridge the release elements and/or integrate the release elements into the circuit simply by separating a wire link or opening a miniature switch.

The known version, in which all the functions are blocked in only one hierarchical level, is also possible by connecting a release element in the voltage supply line for the switching elements. It is particularly advantageous, in this connection, to have a combination in which not all the switching elements have release elements assigned to them, but where one release element is located in the voltage supply line and other release elements for the subsequent hierarchical levels are only assigned to the switching elements concerned.

This very adaptable manual control unit, with its advantageous variability of levels of the release hierarchy to cover a wide variety of possible uses, thus results in an extremely advantageous and economical electromotive furniture drive unit.

BRIEF DESCRIPTION OF THE DRAWINGS

In the following, further details of the invention will be described in the drawings, with reference to some embodiments which are illustrated schematically. Here.

DETAILED DESCRIPTION OF THE INVENTION

Figure 1:
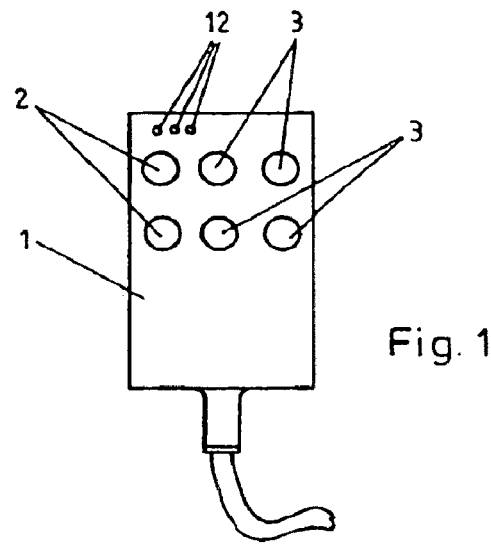
FIG. 1 shows a possible embodiment of a manual control unit for a furniture drive unit.

FIG. 1 schematically illustrates a possible embodiment of a manual control unit 1 for an exemplified electromotive furniture drive unit with three motors. Two switching elements 2 serve to control the drive function of a first motor, while further switching elements 3 are linked to a second and third motor.

The switching elements 2, 3 can only trigger functions if they have previously been released by authorised persons. The release is effected, in particular in a water-tight manual control unit, contact-free in a known manner by means of a magnetic key which is moved into the immediate vicinity of a receive element 13, such as a magnetic switch, located in the manual control unit.

Figure 2:
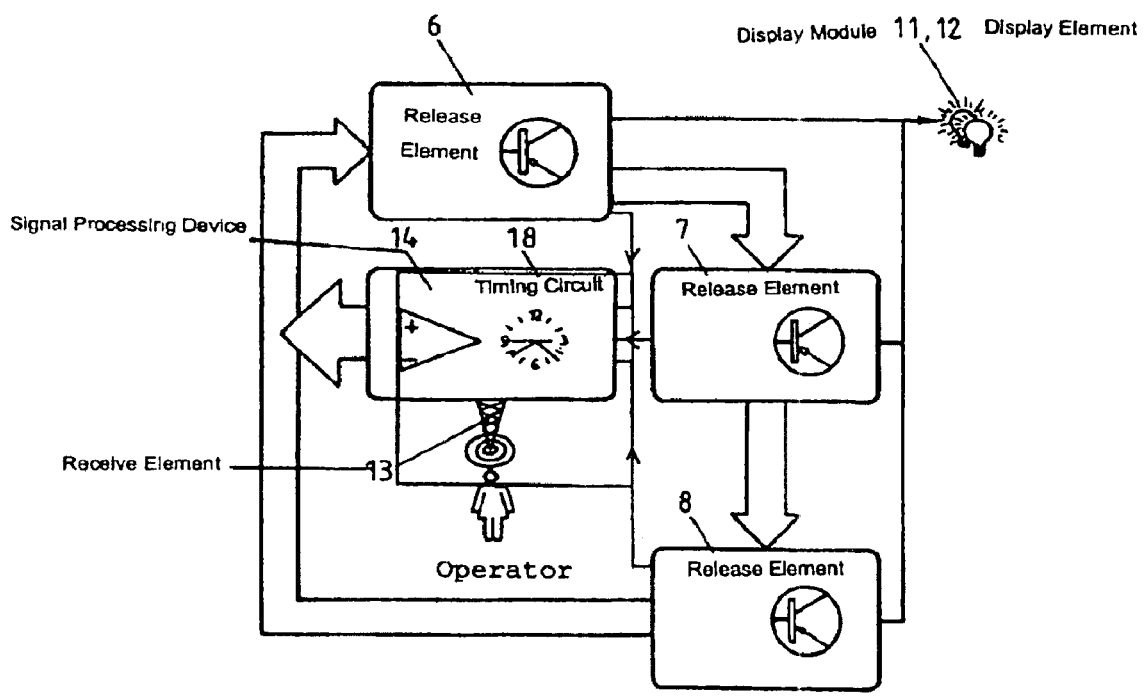
FIG. 2 shows a block diagram of levels of the release hierarchy.

Initial activation of the receive element 13 releases a first hierarchical level via a release element 6, which may, for example, be a semiconductor switch (transistor), as shown in FIG. 2. Activation of the receive element 13 a second time releases a second hierarchical level via a release element 7, and activation a third time releases a third hierarchical level via a release element (8). Activation of the receive element 13 a fourth time switches back into the default state.

Further hierarchical levels are possible, especially in drive units with many different functions. The control for this is provided by means of a signal processing device 14.

A timing circuit 18 enables automatic delayed switching back into the blocked state from different levels of the release hierarchy. This is adjustable, as will be explained in more detail further down.

Each release element 6, 7, 8 is linked to a display element 12 via a display module 11, so that the operator can see which hierarchical level he is in.

Figure 3:
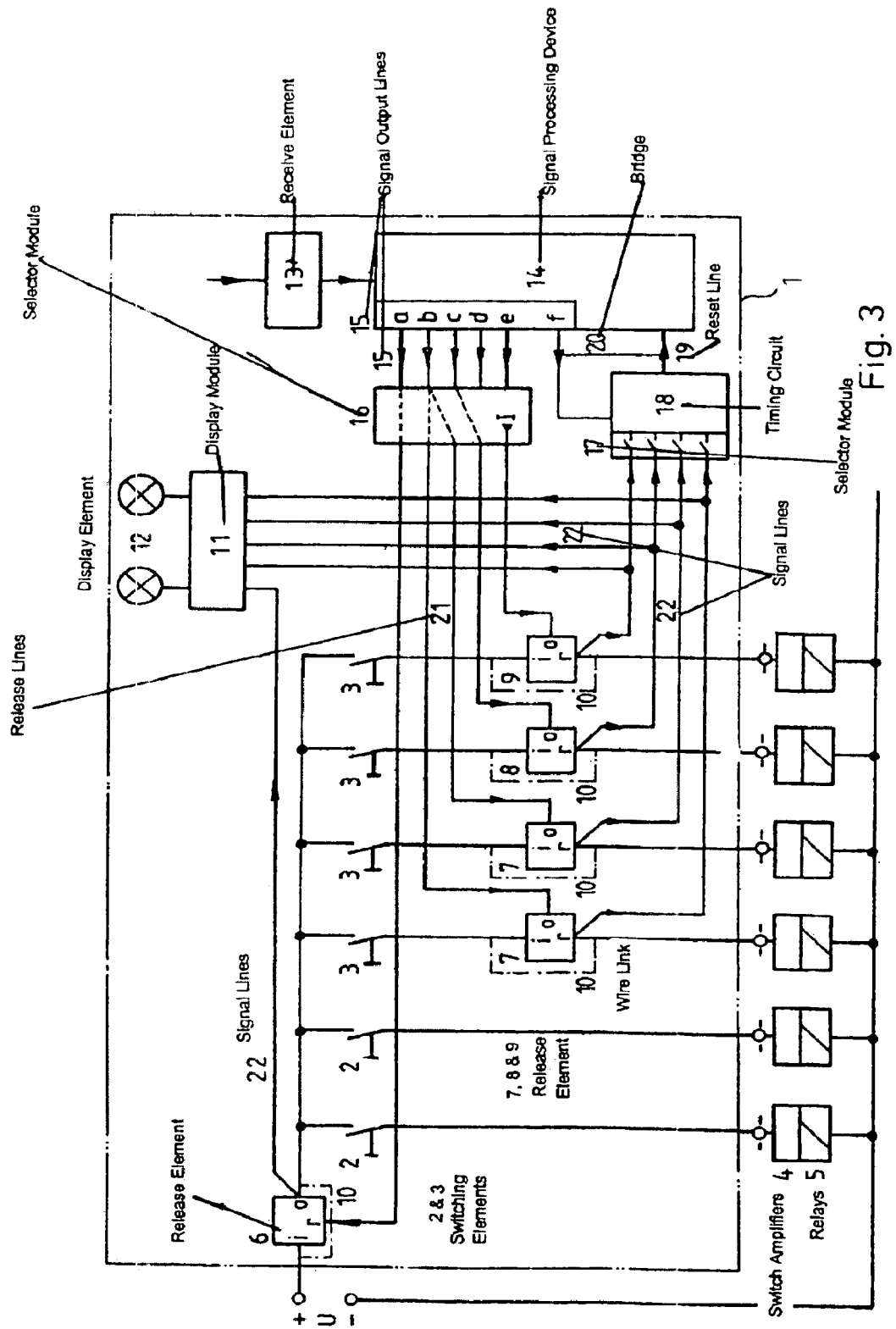
FIG. 3 shows a circuit diagram for a manual control unit, partially in block diagram form.

A detailed representation of a circuit diagram for the manual control unit 1 is shown in FIG. 3. The switching elements 2, 3 are, for example, keying-in units, the switching elements 2 each being connected directly to a relay 5 and the switching elements 3 each being connected to a relay 5 via release elements 7, 8, 9. Each release element 6, 7, 8, 9 has an input i, an output o and a release input r.

For switching elements 2, 3, which can only switch small currents, known switch amplifiers 4 are integrated upstream of the relays 5. Relays 5 and switch amplifiers 4 are not usually located in the manual control unit 1, but in a control housing (not shown). Two relays 5 are provided for each motor, because two different directions of rotation of the motor are addressable individually.

The switching elements 2, 3 are connected to a positive line U+ via the release element 6. This forms a first level of the release hierarchy, namely for the switching elements 2. It is also possible, for this purpose, to arrange two release elements in the respective lines of the switching elements 2 concerned. Further levels of the release hierarchy are formed by the release elements 7, 8, 9.

Omitting the release element 6 dispenses with one hierarchical level, which means that the switching elements 2 cannot be influenced by blocking. They are then associated with functions which, for example, a patient may always use. This version is not shown, but is easy to imagine.

The order of levels in the release hierarchy can be adjusted by means of a selector module 16, which connects the release lines 21 of the release elements 6, 7, 8, 9 to the signal output lines 15a–f of the signal processing device 14. The dashed lines in the selector module 16 show one possible example of a connection, which results in the following hierarchy:

Hierarchical level 1 via release element 6, hierarchical level 2 via release elements 7, hierarchical level 3 via release element 8. Release element 9, by way of example, is permanently released via the selector module 16, which is indicated by a Roman I, meaning that it belongs to hierarchical level 1.

The selector module 16 can be designed as an electronic ganged switch or, in a very simple manner, may consist of wire links.

The receive element 13, which can, for example, be a component that is sensitive to a magnetic field, e.g. a Hall effect sensor or a reed relay, conducts a first received signal to the signal processing device 14, which thereupon activates the first output signal line 15a. A second received signal additionally activates the second output signal line 15b etc. Here, six output signal lines 15a–f are shown by way of example, which are switched on actively, one after the other, in accordance with six successive received signals, i.e. in the penultimate hierarchical level all are active.

The last output signal line 15f is connected via a timing circuit 18 or directly via a bridge 20 to the reset line 19 of the signal processing device 14. As soon as the reset line 19 receives a signal and passes it on to the signal processing device 14, all the output lines 15a–f are deactivated, and thus all the release elements 6, 7, 8, 9 are blocked again.

The signal processing device 14 can, for example, be a shift register, a ring counter or the like.

When a release element 6, 7, 8, 9 is through-connected, a signal is applied to its respective output o, which is also passed on to a display module 11 via signal lines 22, and the display module switches on a respective display element 12. The display elements 12 may, for example, be a multi-coloured visual display.

In the event of a defect in a release element 6, 7, 8, 9, no output signal is present at the respective output o, and the associated display element 12 remains switched off.

In a further embodiment, it is possible that the display module 11 may also be connected to the release lines 21, the signal present on which is compared with the signal lines 22 and, on the basis of such a comparison, the respective display elements 12 are switched on or off, or an error message is issued, e.g. via a separate error message light or an acoustic transmitter.

All, or only selected, signal lines 22 are furthermore connected to the timing circuit 18 via a selector module 17. The selector module 17 can consist of individual separable wire links, or may have mechanical or electronic switches. This can be used to determine which hierarchical level, i.e. which release element, is switched off automatically after a predetermined time, by causing the signal processing device 14 to be reset into its default state via the reset line 19, whereupon all the output signal lines 15*a–f* are deactivated. This is a particularly advantageous safety device.

A further embodiment provides that, after a predetermined time, certain output signals 15*a–f* are activated, in that the timing circuit 18 has a connection (not shown) in order to continue switching the signal processing device 14.

A different embodiment further provides that the release elements 6, 7, 8, 9 are always inserted in the circuitry and are bridged with a wire link 10 or a switch. As long as the wire link 10 is present or the respective switch is closed, the corresponding release element 6, 7, 8, 9 has no function. Simply separating the wire link 10 or opening the respective switch switches the respective release element 6, 7, 8, 9 into the associated line.

In a further embodiment, the receive element 13 can also be designed as a receiver for a wireless signal path, such as infrared, radio link, ultrasound or the like.

It goes without saying, and is therefore not shown, that a separate voltage supply with conventional over-voltage protection elements is provided for the components 11, 13, 14, 16, 17, 18.

LIST OF REFERENCE NUMERALS

1 Manual control unit
2 Switching element
3 Switching element
4 Switch amplifier
5 Relay
6 Release element
7 Release element
8 Release element
9 Release element
10 Bridge
11 Display module
12 Display element
13 Receive element
14 Signal processing device
15*a–f* Output signal line
16 Selector module
17 Selector module
18 Timing circuit
19 Reset line
20 Bridge
21 Release line
22 Signal line
i Input
o Output
r Release input

What is claimed is:

1. An electromotive furniture drive unit with one or more servomotors and having a manual control unit equipped with switching elements and a signal processing device for triggering functions, comprising a plurality of release elements assigned to different hierarchical levels.

2. The electromotive furniture drive unit as claimed in claim 1, wherein the number of hierarchical levels is more than one.

3. The electromotive furniture drive unit as claimed in claim 1, wherein the assignment of the release element to a hierarchical level is designed to be freely selectable by means of a first selector module.

4. The electromotive furniture drive unit as claimed in claim 3, wherein the first selector modules is designed as separable wire links, switches or electronic switches.

5. The electromotive furniture drive unit as claimed in claim 1, wherein certain hierarchical levels are activated or deactivated automatically by means of a timing circuit.

6. The electromotive furniture drive unit as claimed in claim 5, wherein the assignment of certain hierarchical levels for automatic activation and deactivation by the timing circuit is designed to be freely selectable by means of a second selector module.

7. The electromotive furniture drive unit as claimed in claim 6, wherein the second selector module is designed as separable wire links, switches or electronic switches.

8. The electromotive furniture drive unit as claimed in claim 1, wherein each hierarchical level has one output signal line in the signal processing device assigned to it.

9. The electromotive furniture drive unit as claimed in claim 8, wherein a last connected output signal line is connected to a reset line directly via a bridge or via a timing circuit which switches the signal processing device back into the default state.

10. The electromotive furniture drive unit as claimed in claim 1, wherein each of the hierarchical levels has a display element assigned to it.

11. The electromotive furniture drive unit as claimed in claim 10, wherein each display element is connected to an output of a release element.

12. The electromotive furniture drive unit as claimed in claim 11, wherein a display module is connected via signal lines to the outputs of the release elements and to release lines, whereby the display module compares their signals and activates or deactivates the display elements accordingly.

13. The electromotive furniture drive unit as claimed in claim 12, wherein in the event of failure of one of the release elements, the display module deactivates the display element associated with it and/or activates a visual and/or acoustic warning signal.

14. The electromotive furniture drive unit as claimed in claim 13, wherein the display elements consist of a multi-coloured visual display.

15. The electromotive furniture drive unit as claimed in claim 1, wherein the signal processing device is designed as a shift register.

16. The electromotive furniture drive unit as claimed in claim 1, wherein the hierarchical levels are switched on or off by means of a receive element which is activated by an appropriate signal generator.

17. The electromotive furniture drive unit as claimed in claim 16, wherein the receive element is a component that is sensitive to a magnetic field, including a Hall effect sensor.

18. The electromotive furniture drive unit as claimed in claim 16, wherein the receive element is a receiver for wireless signals.

19. The electromotive furniture drive unit as claimed in claim 18, wherein the receive element is a receiver for infrared signals.

20. The electromotive furniture drive unit as claimed in claim 1, wherein the release elements are optionally bridged with a separable wire link or a switch.

21. The electromotive furniture drive unit as claimed in claim 1, wherein a first number of the hierarchical levels is designed to be freely selectable and a second number of the hierarchical levels is permanently set.

22. The electromotive furniture drive unit as claimed in claim 1, wherein each hierarchical level is designed to be freely selectable.

23. The electromotive furniture drive unit as claimed in claim 1, wherein each hierarchical level is designed to be permanently set.

* * * * *